United States Patent
Gajek et al.

(10) Patent No.: US 10,785,041 B2
(45) Date of Patent: Sep. 22, 2020

(54) METHOD FOR PROVIDING A SPACE PUZZLE

(71) Applicant: NEC Laboratories Europe GmbH, Heidelberg (DE)

(72) Inventors: Sebastian Gajek, Flensburg (DE); Ghassan Karame, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 382 days.

(21) Appl. No.: 15/741,297

(22) PCT Filed: Apr. 1, 2016

(86) PCT No.: PCT/EP2016/057273
§ 371 (c)(1),
(2) Date: Jan. 2, 2018

(87) PCT Pub. No.: WO2017/167402
PCT Pub. Date: Oct. 5, 2017

(65) Prior Publication Data
US 2018/0198632 A1    Jul. 12, 2018

(51) Int. Cl.
*H04L 9/32* (2006.01)
*H04L 9/00* (2006.01)
(Continued)

(52) U.S. Cl.
CPC ............. *H04L 9/3271* (2013.01); *H04L 9/00* (2013.01); *H04L 9/008* (2013.01); *H04L 9/0869* (2013.01); *H04L 9/30* (2013.01)

(58) Field of Classification Search
CPC ..... H04L 9/3271; H04L 9/008; H04L 9/0869; H04L 9/30
See application file for complete search history.

(56) References Cited

U.S. PATENT DOCUMENTS

2005/0289289 A1* 12/2005 Chang ................ G06F 21/6218
                                                        711/103
2009/0208019 A1*  8/2009 Celik ................... H04L 63/0478
                                                        380/277
(Continued)

OTHER PUBLICATIONS

Karvelas, Nikolaos; Efficient Proofs of Secure Erasure, Springer Int'l Pub., Switzerland 2014 (Year: 2014).*
(Continued)

*Primary Examiner* — Vance M Little
(74) *Attorney, Agent, or Firm* — Leydig, Voit & Mayer, Ltd.

(57) ABSTRACT

A method for providing a space puzzle includes computing, by a puzzle generating entity (PGE), a master secret key (MSK), a public key (PK), a random predicate (RP), and a secret key (SK) using the computed MSK and the computed RP; providing, by the PGE, a challenge comprising the PK and the SK to a proving computing entity; computing, by the proving computing entity, a response to the challenge using a size of the RP by computing a higher dimensional virtual structure; encrypting each row of the higher dimensional structure with the PK; decrypting the encrypted rows using the SK to obtain a decrypted predicate; recomputing the RP using the decrypted predicate and the higher dimensional virtual structure to provide a recomputed random predicate; and verifying the provided challenge by comparing the recomputed random predicate with the RP.

15 Claims, 5 Drawing Sheets

(51) Int. Cl.
*H04L 9/08* (2006.01)
*H04L 9/30* (2006.01)

(56) References Cited

U.S. PATENT DOCUMENTS

2015/0007337 A1* 1/2015 Krutzik .................. G06F 21/73
                                                            726/26
2015/0358321 A1* 12/2015 Udagawa ............ H04L 63/0442
                                                            713/176

OTHER PUBLICATIONS

Kawai Yutaka et al: "SEPM: Efficient Partial Keyword Search on Encrypted Data", Nov. 20, 2015 (Nov. 20, 2015), Network and Parallel Computing; [Lecture Notes in Computer Science; Lect. Notes Computer], Springer International Publishing, Cham, pp. 75-91, XP047326776.

Stefan Dziembowski et al: "Proofs of Space", International Association for Cryptologic Research, vol. 20150624:192349, Jun. 24, 2015 (Jun. 24, 2015, pp. 1-31, XP061018511.

Acdouglas Stebila et al: "Stronger difficulty notions for client puzzles and denial-of-service-resistant protocols", International Association for Cryptologic Research, vol. 20130220:065421, Feb. 20, 2013 (Feb. 20, 2013), pp. 1-28, XP061006333.

Gajek Sebastian Ed—Walter Didimo et al: "Dynamic Symmetric Searchable Encryption from Constrained Functional Encryption", Feb. 2, 2016 (Feb. 2, 2016), Network and Parallel Computing: [Lecture Notes in Computer Science; Lect. Notes Computer], Springer International Publishing, Cham, pp. 75-89, XP047335441.

Andreas Gabrielsson et al.: "analysis of the Client Puzzles protocol", Bachelor's Thesis at CSC KTH, Mar. 21, 2012 (Mar. 21, 2012), XP055321680.

* cited by examiner

Fig. 1

| | Pre-Processing | | | | | Proof Generation | | | | | |
|---|---|---|---|---|---|---|---|---|---|---|---|
| | Prover | | Verifier | | Rounds | Prover | | Verifier | | Rounds |
| | T | S | T | S | | T | S | T | S | |
| [3] | 1 | 1 | 1 | 1 | 1 | $S$ | $S$ | $S$ | $S$ | 1 |
| [4] | $S \log S$ | $S$ | $\log^2 S$ | $\log S$ | 1 | $S$ | $S$ | 1 | 1 | 1 |
| [6] | $\kappa \cdot S \log S$ | $S$ | $S \log S$ | $S$ | 1 | $S$ | 1 | $S$ | 1 | $\kappa$ |
| [5] | $S \log S$ | $S$ | 1 | 1 | 1 | $\log S$ | $S$ | $\log^2 S$ | $\log S$ | 1 |
| Embodiments | 1 | 1 | 1 | 1 | 1 | $S$ | $S$ | $\sqrt{S}$ | $\sqrt{S}$ | 1 |

METHOD FOR PROVIDING A SPACE PUZZLE

CROSS REFERENCE TO RELATED APPLICATIONS

This application is a U.S. National Stage Application under 35 U.S.C. § 371 of International Application No. PCT/EP2016/057273 filed on Apr. 1, 2016. The International Application was published in English on Oct. 5, 2017 as WO 2017/167402 A1 under PCT Article 21(2).

FIELD

The present invention relates to a method for providing a space puzzle, performed in a memory available to a computation device.

The present invention further relates to a system for providing a space puzzle, performed in a memory available to one or more computation devices, said system comprising a puzzle generating computing entity in a proving computing entity.

The present invention further relates to a puzzle generating computing entity for generating a space puzzle.

The present invention even further relates to a proving computing entity for verifying a response of a challenge of a space puzzle.

The present invention even further relates to a non-transitory computer readable medium storing a program causing a computer to execute a method for providing a space puzzle.

The present invention even further relates to a non-transitory computer readable medium storing a program causing a computer to execute a method for generating a space puzzle.

The present invention even further relates to a non-transitory computer readable medium storing a program causing a computer to execute a method for verifying a response of a challenge of a space puzzle The present invention even further relates to a method for providing a proof-of-erasure of a memory of a computation device.

The present invention even further relates to a method for providing a proof-of-work.

BACKGROUND

Client puzzles are tightly coupled with Proof of Work systems in which a client (prover) needs to demonstrate to a puzzle generator (verifier) that it has expended a certain level of computational effort in a specified interval of time.

Client puzzles found their application in several domains, e.g. prevention against DoS attacks, protection from connection depletion attacks, or protection against collusion. Several computational puzzles have been proposed in the recent years. Due to the wide variety in CPU speeds conventional puzzles are prevented from being globally deployed since it is hard to correctly estimate the computational resources available at the prover.

Leveraging proofs of space for provably secure wipe-outs is shown in the non-patent literature of Daniele Perito, Gene Tsudik: Secure Code Update for Embedded Devices via Proofs of Secure Erasure. In Proceedings of ESORICS 2010: a construction is given in which the verifier communicates a string of length S, and obtains a proof in form of a hashed MAC over the string. One of the problems is however that said construction impractical with growing S, e.g. when considering a cloud with some terabytes storage capacity.

Follow-up conventional work addressed the need to reduce the complexity to an order sublinear in the size of S. In the non-patent literature of Stefan Dziembowski, Sebastian Faust, Vladimir Kolmogorov, and Krzysztof Pietrzak. Proofs of space. Cryptology ePrint Archive, Report 2013/796, 2013 a method is shown based on graph pebbling. The communication is minimized complexity to $O(\log S)$, but requires a pre-processing in which the prover and verifier allocate space $O(S)$ and $O(\log S)$, respectively.

In the non-patent literature of Nikolaos P. Karvelas and Aggelos Kiayias. Efficient proofs of secure erasure. In SCN'14 a variant of the pebbling game with a storage complexity $O(S)$ in the preprocessing model is shown, but the verifier needs to reserve $O(1)$ space in the online phase.

In the non-patent literature of Giuseppe Ateniese, Ilario Bonacina, Antonio Faonio, and Nicola Galesi. Proofs of space: When space is of the essence. In SCN'14 a variant of the pebbling game is shown with $O(1)$ verifier storage complexity, but requires the verifier to seize $O(\log S)$ space in the online phase.

SUMMARY

In an embodiment, the present invention provides a method for providing a space puzzle, the method being performed in a memory available to a computation device, the method using functional encryption for key generation, encryption, and decryption. The method includes computing, by a puzzle generating entity (PGE), a master secret key (MSK), and a public key (PK); computing, by the PGE, a random predicate (RP); computing, by the PGE, a secret key (SK), using the computed MSK and the computed RP; providing, by the PGE, a challenge comprising the PK and the SK, to a proving computing entity; computing, by the proving computing entity, a response to the challenge using a size of the RP by computing a higher dimensional virtual structure, each dimension of the higher dimensional virtual structure being of the size of the RP; encrypting each row of the higher dimensional structure with the PK; decrypting the encrypted rows using the SK to obtain a decrypted predicate; recomputing the RP using the decrypted predicate and the higher dimensional virtual structure to provide a recomputed random predicate; and verifying the provided challenge by comparing the recomputed random predicate with the RP.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Although applicable to any kind of scenario, embodiments of the present invention will be described with regard to a proof-of-work scenario.

Embodiments of the present invention provide a space puzzle which requires no pre-processing. Embodiments of the present invention further provide an easier adjustment of a space puzzle based on requirements. Embodiments of the present invention further reduce the amount of space compared with conventional methods and systems.

In an embodiment, the present invention provides a method performed in a memory available to a computation device, for providing a space puzzle, using functional encryption for key generation, encryption and decryption, comprising the steps of:
 a) Computing, by a puzzle generating entity, 'PGE', a master secret key, 'MSK', and a public key, 'PK',
 b) Computing, by said PGE, a random predicate, 'RP',
 c) Computing, by said PGE, a secret key, 'SK', using said computed MSK and said computed RP,
 d) Providing, by said PGE, a challenge comprising said PK and said SK, to a proving computing entity,
 e) Computing, by said proving computing entity, a response to said challenge using the size of said RP by computing a higher dimensional virtual structure each dimension of said higher dimensional virtual structure being of said size of said RP,
 f) Encrypting each row of said higher dimensional structure with said PK,
 g) Decrypting said encrypted rows using said SK to obtain a decrypted predicate,
 h) Recomputing said RP using said decrypted predicate and said higher dimensional virtual structure,
 i) Verifying said provided challenge by comparing said recomputed RP with said random predicate.

In a further embodiment, the present invention provides a system for providing a space puzzle, performed in a memory available to one or more computation devices, said system using functional encryption for key generation, encryption and decryption, said system comprising a puzzle generating computing entity and a proving computing entity, said puzzle generating computing entity being adapted to:
 a) Compute a master secret key, 'MSK', and a public key, 'PK',
 b) Compute a random predicate, 'RP',
 c) Compute a secret key, 'SK', using said computed MSK and said computed RP,
 d) Provide a challenge comprising said PK and said SK, to said proving computing entity, and
 e) Verify a response of said challenge, provided by said proving computing entity by comparing said challenge with said random predicate, and said proving computing entity being adapted to
 f) Compute a response to said challenge using the size of said RP by computing a higher dimensional virtual structure each dimension being of said size of said RP,
 g) Encrypt each row of said higher dimensional structure with said PK,
 h) Decrypt said encrypted rows using said SK to obtain a decrypted predicate,
 i) Computing a response by recomputing said RP using said decrypted predicate and said higher dimensional virtual structure,
 j) Provide said response to said puzzle generating entity.

In a further embodiment, the present invention provides a puzzle generating computing entity for generating a space puzzle, using functional encryption for key generation, encryption and decryption, being adapted to:
 a) Compute a master secret key, 'MSK', and a public key, 'PK',
 b) Compute a random predicate, 'RP',
 c) Compute a secret key, 'SK', using said computed MSK and said computed RP,
 d) Compute a challenge comprising said PK and said SK, and to
 e) Verify a response of said challenge by comparing said challenge with said random predicate.

In a further embodiment the present invention provides a proving computing entity for verifying a response of a challenge of a space puzzle generated using functional encryption for key generation, encryption and decryption, being adapted to:
 a) Computing a higher dimensional virtual structure, each dimension being of a size of a random predicate, 'RP',
 b) Encrypt each row of said higher dimensional structure with a public key provided by a challenge,
 c) Decrypt said encrypted rows using said secret key corresponding to said public key to obtain a decrypted predicate,
 d) Compute a response to said challenge by recomputing said RP using said decrypted predicate and said higher dimensional virtual structure.

In a further embodiment the present invention provides a non-transitory computer readable medium storing a program causing a computer to execute a method for providing a space puzzle, using functional encryption for key generation, encryption and decryption, comprising the steps of:
 a) Computing, by a puzzle generating entity, 'PGE', a master secret key, 'MSK', and a public key, 'PK',
 b) Computing, by said PGE, a random predicate, 'RP',
 c) Computing, by said PGE, a secret key, 'SK', using said computed MSK and said computed RP,
 d) Providing, by said PGE, a challenge comprising said PK and said SK, to a proving computing entity,
 e) Computing, by said proving computing entity, a response to said challenge using the size of said RP by computing a higher dimensional virtual structure each dimension being of said size of said RP,
 f) Encrypting each row of said higher dimensional structure with said PK,
 g) Decrypting said encrypted rows using said SK to obtain a decrypted predicate,
 h) Recomputing said RP using said decrypted predicate and said higher dimensional virtual structure,
 i) Verifying said challenge by comparing said challenge with said recomputed random predicate.

In a further embodiment the present invention provides a non-transitory computer readable medium storing a program causing a computer to execute a method for generating a space puzzle, using functional encryption for key generation, encryption and decryption, being adapted to:
 a) Compute a master secret key, 'MSK', and a public key, 'PK',
 b) Compute a random predicate, 'RP',
 c) Compute a secret key, 'SK', using said computed MSK and said computed RP,
 d) Compute a challenge comprising said PK and said SK, and to
 e) Verify a response of said challenge by comparing said challenge with said random predicate.

In a further embodiment the present invention provides a non-transitory computer readable medium storing a program causing a computer to execute a method for verifying a response of a challenge of a space puzzle generated using functional encryption for key generation, encryption and decryption, being adapted to:
a) Computing a higher dimensional virtual structure, each dimension being of a size of a random predicate, 'RP',
b) Encrypt each row of said higher dimensional structure with a public key provided by a challenge,
c) Decrypt said encrypted rows using said secret key corresponding to said public key to obtain a decrypted predicate,
d) Compute a response to said challenge by recomputing said RP using said decrypted predicate and said higher dimensional virtual structure.

In a further embodiment the present invention provides a proof-of-erasure of a memory of a computation device, wherein a method according to one of the claims 1-7 is performed, wherein said random predicate is computed such that the size of said memory equals the size of said random challenge and wherein upon successful verification erasure of said memory is determined.

In a further embodiment the present invention provides a proof-of-work, wherein a method is performed upon receiving a request for access of a resource of a provider by a client such that the provider acts as the space puzzle generating computing entity and the client acts as proving computing entity and wherein upon successful verification the provider grants access to its resource.

At least one embodiment of the present invention may have at least one of the following advantages: Reduced amount of space; Enhanced flexibility; No pre-processing necessary; and Enhanced efficiency since memory is not wasted in the pre-processing step.

The term "functional encryption" can be understood in its broadest sense and refers in particular in the claims, preferably in the specification, to a functional encryption scheme for the class of inner product predicates P. A predicate P: $\{0,1\}^n \times \{0,1\}^n \rightarrow \{0,1\}$ may compute the bit-wise inner product of two n-bit strings x,y, i.e.

$$P(x) = \sum_{i=1}^{n} x\_i y\_i \mod 2$$

Learning the predicate P, that may be an n-bit string y, requires $O((n/5)^2)$ space and $O(\text{poly } n)$ time; with less space, learning the predicate requires exponential time.

A functional encryption scheme for the class of inner product predicates comprises four polynomial-time algorithms (Setup, KeyGen, Encrypt, Decrypt), such that
the setup algorithm Setup on input a security parameter k outputs a master secret MSK and a public key PK;
the key generation algorithm KeyGen on input the master secret MSK and a (description of a) predicate P, outputs a decryption key $SK_P$;
the encryption algorithm Encrypt on input the public key PK and a message x, outputs a ciphertext Ctx; and
the decryption algorithm Decrypt on input the decryption key $SK_P$ and a ciphertext Ctx, outputs P(x).

Such inner product functional encryption schemes are sometimes called inner-product encryptions IPE. They are known to exist in groups and lattices under standard cryptographic assumptions; and moreover, for the class of inner-product functions they are known to be efficient.

The terms "puzzle generating entity" and "providing computing entity", etc. can each refer in particular in the claims, preferably in the specification, to a device adapted to perform computing like a personal computer, a tablet, a mobile phone, a server, or the like and comprises one or more processors having one or more cores and may be connectable to a memory for storing an application which is adapted to perform corresponding steps of one or more of the embodiments of the present invention. Any application may be software based and/or hardware based installed in the memory on which the processor(s) can work on. The computing devices may be adapted in such a way that the corresponding steps to be computed are performed in an optimized way. For instance different steps may be performed in parallel with a single processor on different of its cores. The devices or devices may also be instantiated as a virtual device running on a physical computing resource. Different devices may therefore be executed on said physical computing resource.

The term "computer readable medium" can refer to any kind of medium, which can be used together with a computation device or computer and on which information can be stored. Said information may be any kind of data which can be read into a memory of a computer. For example said information may include program code for executing with said computer. Examples of a computer readable medium are tapes, CD-ROMs, DVD-ROMs, DVD-RAMs, DVD-RWs, BluRay, DAT, MiniDisk, solid state disks SSD, floppy disks, SD-cards, CF-cards, memory-sticks, USB-sticks, EPROM. EEPROM or the like.

The term "challenge" can is to be understood in its broadest sense and can refer in particular in the claims, preferably in the specification to any kind of information provided for example in form of a message or the like.

The term "response" is to be understood in its broadest sense and can refer in particular in the claims, preferably in the specification to any kind of information, for example in form of a message, comprising e.g. corresponding information computed from the information provided by a challenge.

The term "higher dimensional virtual structure" is to be understood in its broadest sense and can refer in particular in the claims, preferably in the specification to any kind of a virtual arrangement of data like entries, etc., said entries comprising data or information. The term "higher-dimensional" is to be understood in its broadest sense and can refer in particular in the claims, preferably in the specification to any dimension greater or equal then 2.

The term "predicate" is to be understood in its broadest sense and can refer in particular in the claims, preferably in the specification to any kind of data or information having a certain size.

The term "space puzzle" can refer in particular in the claims, preferably in the specification, to a computational problem which requires some allocation of storage to be solvable. It can include four polynomial-time algorithms (Gen, Challenge, Response, Verify), such that
the key generation algorithm Gen outputs some puzzle parameters PP;
the challenge generation algorithm Challenge on input the parameters PP and a security parameter k outputs a challenge ch of size n(k), where n is polynomial in the security parameter k;
the challenge response algorithm Response on input the challenge ch outputs a response res; and the verification algorithm Verify on input the parameters PP, the challenge ch and response res, accepts/rejects the response as a valid puzzle solution.

The higher dimensional structure may be a two-dimensional matrix of n×n-size, said n being the size of said RP. This enables to provide a fast computation.

The RP can be computed using the inverse of said higher dimensional virtual structure. This enables a reliable computation since conventional methods to generate an inverse may be used.

Gaussian Elimination can be used for recomputing said RP. This enables to provide a fast and reliable way to recompute said RP.

The predicate can be a random string of size n bit. When the challenge is of size n, it requires space of $O((n/5)^2)$ for the space puzzle to be solvable in polynomial time and with less space than said $O((n/5)^2)$ the space puzzle is solvable even in exponential time.

The contents of said higher virtual structure can be chosen randomly. This allows in a fast way to provide the contents of said higher dimensional virtual structure.

Figure 1:
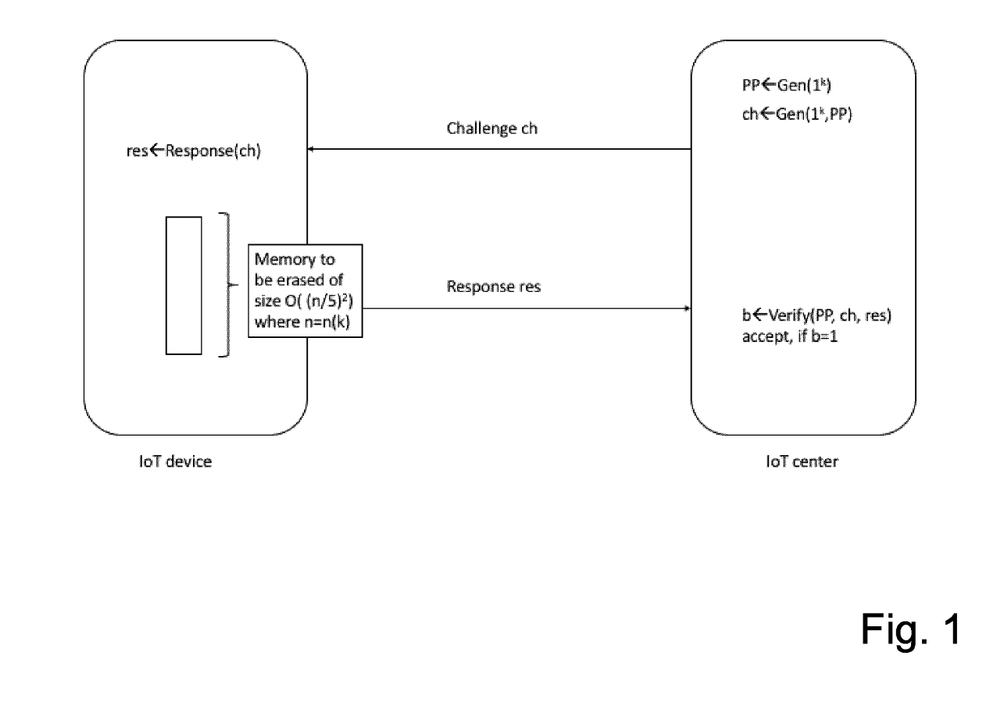
FIG. 1 shows steps of a method according to an embodiment of the present invention.

FIG. 1 shows steps of the method according to an embodiment of the present invention. In FIG. 1 a protocol for a secure erasure of an Internet of Things IoT device is shown: For example to strengthen IoT device security while relying on minimal hardware assumptions a secure boot process may be ensured and the necessary code is preloaded within the device. Securing the boot process can be achieved by ensuring that on every boot, the device re-initializes its entire memory. By doing so, since all the memory (including RAM) of the device will be purged, any malware that has been installed on the device will be deleted.

In this respect a space puzzle according to an embodiment of the present invention is used to prove that a device erased its memory of size N as follows. A random challenge for a space of size N=N(n) is generated and then said challenge is sent over to the IoT device in question. When the IoT device answers with a valid response, the proof is accepted that the device erased its memory.

In detail, FIG. 1 shows a puzzle based on functional encryptions for inner products. The space puzzle comprises four procedures: PUZZ=(Gen, Challenge, Response, Verify). The space puzzle is then executed such that:

Gen($1^k$): Invoke FHE.Setup($1^k$) with security parameter k to obtain the master secret MSK and public key PK. Set PP as the pair (PK, MSK). "FHE" here denotes fully homomorphic encryption.

Challenge(PP): Choose a random predicate P (what corresponds to a random n-bit string y) and obtain the secret key $SK_P$ by running KeyGen(MSK, P). Send the challenge ch=(PK, $SK_P$).

Response(ch): To answer the challenge, one has to learn the n-bit string y. The prover chooses a square bit matrix $A^{n \times n}$ and encrypts each row $x_i$ of matrix A with the encryption algorithm Encrypt(PK, $x_i$). It then decrypts the predicate P($x_i$) with Decrypt($SK_P$, $Ctx_i$). To solve the puzzle it must solve the linear system Ay=P(x), using Gaussian Elimination y=$A^{-1}$ P(x) (where $A^{-1}$ is the inverse Matrix). The algorithm sets the response res=y.

Verify(PP,ch, res): the algorithm accepts the puzzle solution, if and only if res=y.

In another embodiment the space puzzle can be used as a proof-of-work system. Here, to prevent connection depletion attacks, the service provider asks the client to solve an instance based on the space puzzle. The client commits enough resources (space and time) to solve the space puzzle and sends the solution as response back to the provider. If the solution is correct, the provider grants access to the client. Otherwise, the connection/service request is denied.

Figure 2:
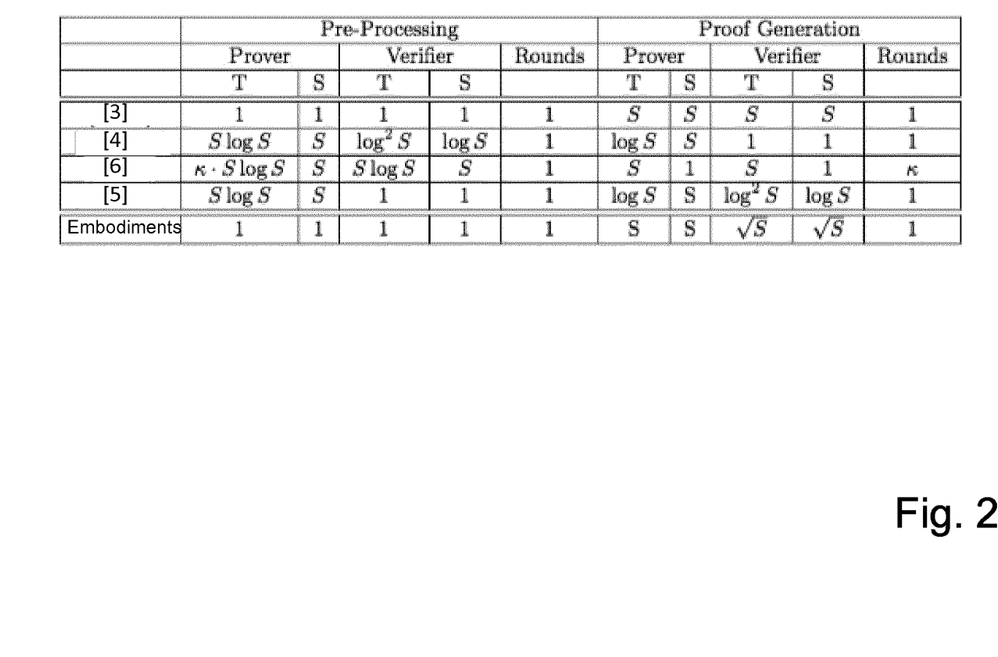
FIG. 2 shows a table for comparison of embodiments of the present invention and conventional methods.

FIG. 2 shows a table for comparison of embodiments of the present invention and conventional methods. In FIG. 2 an asymptotic comparison between embodiments of the present invention and conventional methods and systems is shown. "T" in the third line means the time necessary for preprocessing respectively for proof generation. The variable "S" in the third line means the space necessary for the prover or the verifier for preprocessing or for proof generation. Below the third line "S" means the length of the string. All entries means "order of" so for example in the fifth line, the prover needs the time of order O (S log S) and space of O(S) for preprocessing.

In FIG. 2, [3] refers to the non-patent literature of Daniele Perito, Gene Tsudik: Secure Code Update for Embedded Devices via Proofs of Secure Erasure. In Proceedings of ESORICS 2010. [4] in FIG. 2 refers to the non-patent literature of Stefan Dziembowski, Sebastian Faust, Vladimir Kolmogorov, and Krzysztof Pietrzak. Proofs of space. Cryptology ePrint Archive, Report 2013/796, 2013. [5] in FIG. 2 refers to the non-patent literature of Giuseppe Ateniese, Ilario Bonacina, Antonio Faonio, and Nicola Galesi. Proofs of space: When space is of the essence. In SCN'14. [6] in FIG. 2 refers to the non-patent literature of Nikolaos P. Karvelas and Aggelos Kiayias. Efficient proofs of secure erasure. In SCN"14.

Figure 3:
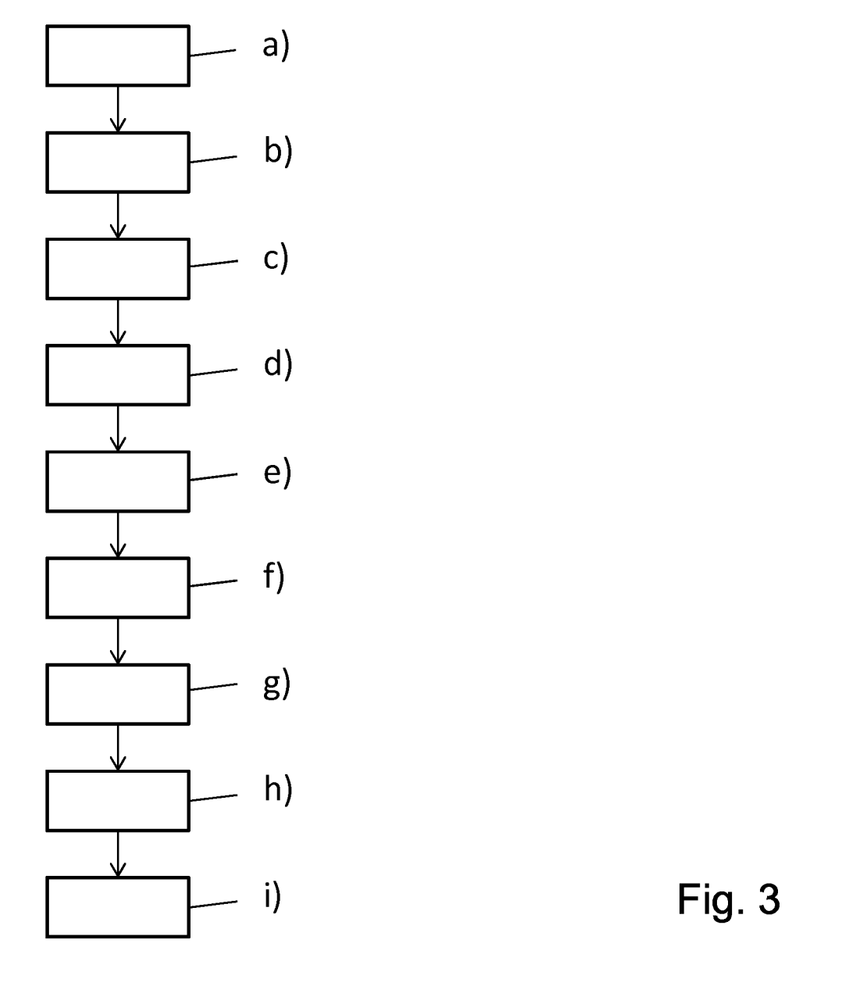
FIG. 3 shows steps of a method according to an embodiment of the present invention.

FIG. 3 shows steps of a method according to a further embodiment of the present invention. In FIG. 3 steps of a method for providing a space puzzle, performed in a memory available to a computation device are shown, using functional encryption for key generation, encryption and decryption, comprising the steps of:

a) Computing, by a puzzle generating entity, 'PGE', a master secret key, 'MSK', and a public key, 'PK'
b) Computing, by said PGE, a random predicate, 'RP',
c) Computing, by said PGE, a secret key, 'SK', using said computed MSK and said computed RP,
d) Providing, by said PGE, a challenge comprising said PK and said SK, to a proving computing entity,
e) Computing, by said proving computing entity, a response to said challenge using the size of said RP by computing a higher dimensional virtual structure each dimension of said higher dimensional virtual structure being of said size of said RP,
f) Encrypting each row of said higher dimensional structure with said PK,
g) Decrypting said encrypted rows using said SK to obtain a decrypted predicate,
h) Recomputing said RP using said decrypted predicate and said higher dimensional virtual structure.
i) Verifying said provided challenge by comparing said recomputed RP with said random predicate.

Figure 4:
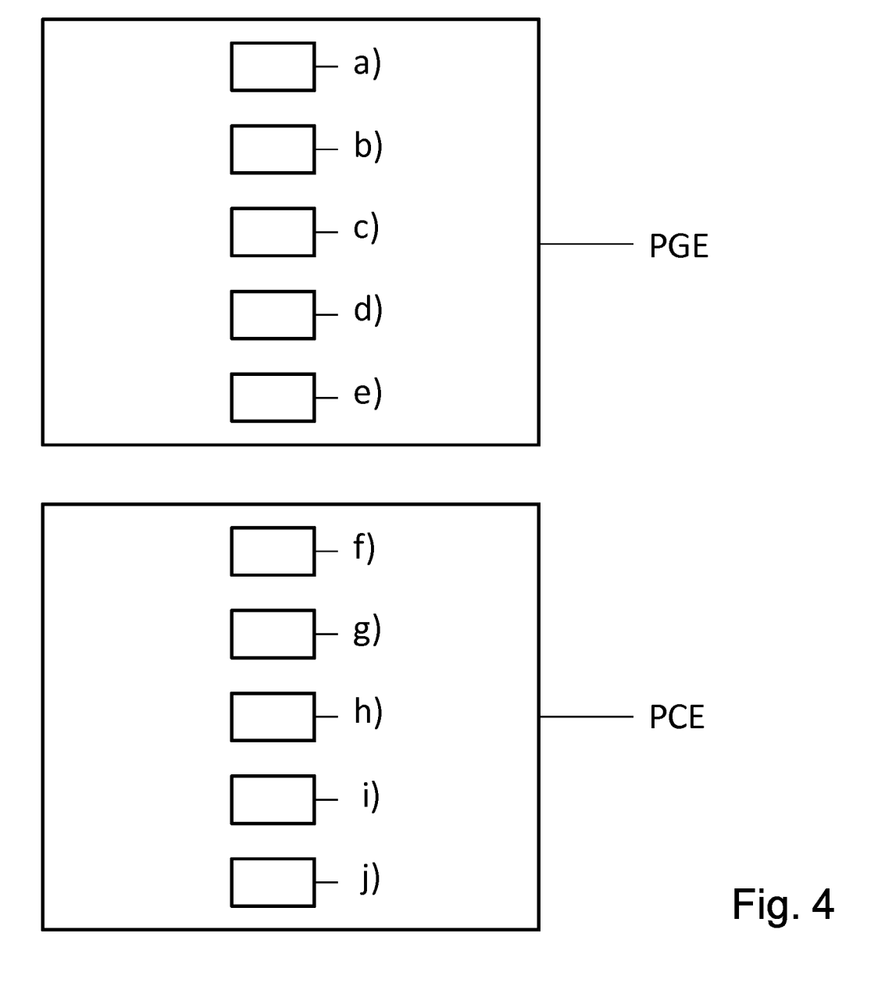
FIG. 4 shows a system according to an embodiment of the present invention.

FIG. 4 shows a system according to a further embodiment of the present invention. In FIG. 4 a system for providing a space puzzle is shown, performed in a memory available to one or more computation devices, said system using functional encryption for key generation, encryption and decryption, said system comprising a puzzle generating computing entity and a proving computing entity, said puzzle generating computing entity PGE being adapted to:

a) Compute a master secret key, 'MSK', and a public key, 'PK',
b) Compute a random predicate, 'RP',
c) Compute a secret key, 'SK', using said computed MSK and said computed RP, d) Provide a challenge comprising said PK and said SK, to said proving computing entity, and
e) Verify a response of said challenge, provided by said proving computing entity by comparing said challenge with said random predicate, and said proving computing entity PCE being adapted to
f) Compute a response to said challenge using the size of said RP by computing a higher dimensional virtual structure each dimension being of said size of said RP,
g) Encrypt each row of said higher dimensional structure with said PK,
h) Decrypt said encrypted rows using said SK to obtain a decrypted predicate,
i) Computing a response by recomputing said RP using said decrypted predicate and said higher dimensional virtual structure,
j) Provide said response to said puzzle generating entity.

Figure 5:
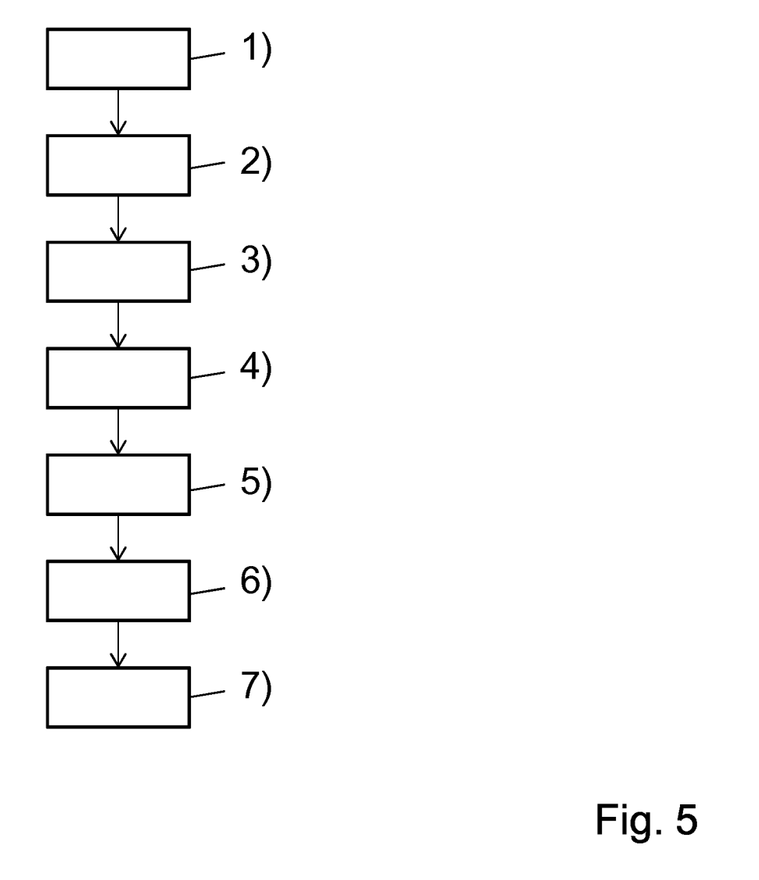
FIG. 5 shows steps of a method according to an embodiment of the present invention.

FIG. 5 shows steps of a method according to a further embodiment of the present invention. In FIG. 5 a method for providing a space puzzle is shown, comprising the steps of:
1) The puzzle generator creates a master secret and a public key.
2) The puzzle generator generates a random n-bit stringy and uses it to create a secret key.
3) The puzzle generator sends a challenge based on the public key and the secret key.
4) To answer the challenge, the prover uses the public key to encrypt a randomly generated (m×n) matrix with an encryption algorithm.
5) The prover decrypts the matrix using $SK_P$, and then proceeds to solve a linear system of equations.
6) The prover sends the solution of the linear system to the puzzle generator.
7) The generator accepts the solution if and only if the solution is correct.

In summary the embodiments of the present invention enable or provide the following: creation of a space puzzle based on functional encryption by, e.g., sending an n bit string, a public key and a secret key, and requiring the prover to encrypt the string, then decrypt it with those specific keys in order to form a linear set of equations thus committing a quadratic amount of space; and use of a space puzzle to construct to efficiently construct secure proofs of erasure of space-limited IoT devices.

Embodiments of the present invention can provide one or more of the following advantages: Quadratic space lower bound; No pre-processing required; Low memory requirement since it is not wasted in a pre-processing step; High applicability for example using for proofs of secure erasure of IoT devices; Preventing resource depletion attacks; and Obfuscation of control flow of software, etc.

In other words, embodiments of the present invention can enable a memory-bound puzzle scheme based on functional encryption schemes. These puzzles allow the construction of computationally mild, space starving problems, e.g. a puzzle instantiated with challenge size n needs space $O((n/5)^2)$ to be solvable in polynomial time; with less space than $O((n/5)^2)$ the puzzle is solvable in exponential time. These puzzles can be applied in enabling proofs of secure erasure of IoT devices, and in preventing resource depletion attacks.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for providing a space puzzle, the method being performed in a memory available to a computation device, the method using functional encryption for key generation, encryption, and decryption, the method comprising:
a) computing, by a puzzle generating entity (PGE), a master secret key (MSK), and a public key (PK);
b) computing, by the PGE, a random predicate (RP);
c) computing, by the PGE, a secret key (SK), using the computed MSK and the computed RP;
d) providing, by the PGE, a challenge comprising the PK and the SK, to a proving computing entity;
e) computing, by the proving computing entity, a response to the challenge using a size of the RP by computing a higher dimensional virtual structure, each dimension of the higher dimensional virtual structure being of the size of the RP;
f) encrypting each row of the higher dimensional structure with the PK;
g) decrypting the encrypted rows using the SK to obtain a decrypted predicate,
h) recomputing the RP using the decrypted predicate and the higher dimensional virtual structure to provide a recomputed RP; and
i) verifying the response to the challenge by comparing the recomputed RP with the RP.

2. The method according to claim 1, wherein the higher dimensional structure is a two dimensional matrix of n×n size, n being the size of the RP.

3. The method according to claim 1, wherein the RP is computed using the inverse of the higher dimensional virtual structure.

4. The method according to claim 2, wherein Gaussian Elimination is used for recomputing the RP.

5. The method according to claim 1, wherein the predicate is a random string of size n bit.

6. The method according to claim 5, wherein the challenge with the predicate of size n bit is of size $O((n/5)^2)$.

7. The method according to claim 1, wherein the contents of the higher dimensional virtual structure is chosen randomly.

8. A system for providing a space puzzle, performed in a memory available to one or more computation devices, the system using functional encryption for key generation, encryption, and decryption, the system comprising:
  a puzzle generating hardware computing entity adapted to:
    a) compute a master secret key (MSK) and a public key (PK);
    b) compute a random predicate (RP),
    c) compute a secret key (SK) using the computed MSK and the computed RP,
    d) provide a challenge comprising the PK and the SK to a proving hardware computing entity, and
    e) verify a response to the challenge, provided by the proving hardware computing entity, by comparing the response to the challenge with the RP; and
  the proving hardware computing entity, being adapted to:
    f) compute the response to the challenge using a size of the RP by computing a higher dimensional virtual structure, each dimension being of the size of the RP,
    g) encrypt each row of the higher dimensional structure with the PK,
    h) decrypt the encrypted rows using the SK to obtain a decrypted predicate,
    i) recompute the RP using the decrypted predicate and the higher dimensional virtual structure, and
    j) provide the recomputed RP as the response to the challenge to the puzzle generating hardware entity.

9. A puzzle generating hardware computing entity for generating a space puzzle, using functional encryption for key generation, encryption, and decryption, the puzzle generating hardware computing entity being adapted to:
  a) compute a master secret key (MSK), and a public key (PK),
  b) compute a random predicate (RP),
  c) compute a secret key (SK), using the computed MSK and the computed RP,
  d) compute a challenge comprising the PK and the SK, and
  e) verify a response to the challenge by comparing a recomputed RP with the RP, the recomputed RP being based on a decrypted predicate obtained from decrypting, using the SK, encrypted rows of a higher dimensional virtual structure with each dimension being of the size of the RP and each row of the higher dimensional structure having been encrypted with the PK.

10. A proving hardware computing entity for verifying a response of a challenge of a space puzzle generated using functional encryption for key generation, encryption, and decryption, the proving hardware computing entity being adapted to:
  a) compute a higher dimensional virtual structure, each dimension being of a size of a random predicate (RP) which was computed by a puzzle generating hardware entity,
  b) encrypt each row of the higher dimensional structure with a public key provided by a challenge from the puzzle generating hardware entity,
  c) decrypt the encrypted rows using a secret key corresponding to the public key to obtain a decrypted predicate,
  d) compute a response to the challenge by recomputing the RP using the decrypted predicate and the higher dimensional virtual structure, and providing the recomputed RP to the puzzle generating hardware entity for verification of the response to the challenge.

11. A non-transitory computer readable medium storing a program causing a computer to execute a method for providing a space puzzle, using functional encryption for key generation, encryption, and decryption, the method comprising:
  a) computing, by a puzzle generating entity (PGE), a master secret key (MSK), and a public key (PK),
  b) computing, by the PGE, a random predicate (RP),
  c) computing, by the PGE, a secret key (SK), using the computed MSK and the computed RP,
  d) providing, by the PGE, a challenge comprising the PK and the SK, to a proving computing entity,
  e) computing, by the proving computing entity, a response to the challenge using a size of the RP by computing a higher dimensional virtual structure, each dimension being of the size of the RP,
  f) encrypting each row of the higher dimensional structure with the PK,
  g) decrypting the encrypted rows using the SK to obtain a decrypted predicate,
  h) recomputing the RP using the decrypted predicate and the higher dimensional virtual structure to provide a recomputed RP,
  i) verifying the response to the challenge by comparing the recomputed RP with the RP.

12. A non-transitory computer readable medium storing a program causing a computer to execute a method for generating a space puzzle, using functional encryption for key generation, encryption, and decryption, the method comprising:
  a) computing a master secret key (MSK), and a public key (PK),
  b) computing a random predicate (RP),
  c) computing a secret key (SK), using the computed MSK and the computed RP,
  d) computing a challenge comprising the PK and the SK, and
  e) verifying a response to the challenge by comparing a recomputed RP with the RP, the recomputed RP being based on a decrypted predicate obtained from decrypting, using the SK, encrypted rows of a higher dimensional virtual structure with each dimension being of the size of the RP and each row of the higher dimensional structure having been encrypted with the PK.

13. A non-transitory computer readable medium storing a program causing a computer to execute a method for verifying a response of a challenge of a space puzzle generated using functional encryption for key generation, encryption, and decryption, the method comprising:
  a) computing a higher dimensional virtual structure, each dimension being of the size of a random predicate (RP) which was computed by a puzzle generating entity,
  b) encrypting each row of the higher dimensional structure with a public key provided by a challenge from the puzzle generating entity,
  c) decrypting the encrypted rows using a secret key provided by the challenge to obtain a decrypted predicate,
  d) computing a response to the challenge by recomputing the RP using the decrypted predicate and the higher dimensional virtual structure, and providing the recomputed RP to the puzzle generating entity for verification of the response to the challenge.

14. A method for providing a proof-of-erasure of a memory of a computation device, wherein a method according to claim 1 is performed, wherein the RP is computed such that the size of the memory equals the size of the random challenge and wherein upon successful verification erasure of the memory is determined.

15. A method for providing a proof-of-work, wherein a method according to claim 1 is performed upon receiving a request for access of a resource of a provider by a client such that the provider acts as the space puzzle generating computing entity and the client acts as the proving computing entity and wherein upon successful verification the provider grants access to the resource.

* * * * *